US010376819B2

(12) United States Patent
Lin

(10) Patent No.: US 10,376,819 B2
(45) **Date of Patent: *Aug. 13, 2019**

(54) FILTER CORE AND MANUFACTURING METHOD THEREOF

(71) Applicant: PRO-PURE INC., New Taipei (TW)

(72) Inventor: Hsiang-Chi Lin, New Taipei (TW)

(73) Assignee: PRO-PURE INC., New Taipei (TW)

( * ) Notice: Subject to any disclaimer, the term of this patent is extended or adjusted under 35 U.S.C. 154(b) by 371 days.

This patent is subject to a terminal disclaimer.

(21) Appl. No.: 15/246,339

(22) Filed: Aug. 24, 2016

(65) Prior Publication Data

US 2018/0015393 A1 Jan. 18, 2018

(30) Foreign Application Priority Data

Jul. 15, 2016 (TW) ............................ 105122384 A

(51) Int. Cl.

| | |
|---|---|
| ***B01D 25/00*** | (2006.01) |
| ***B01D 29/00*** | (2006.01) |
| ***B01D 29/11*** | (2006.01) |
| ***B29C 65/52*** | (2006.01) |
| ***B32B 37/00*** | (2006.01) |
| ***B32B 37/12*** | (2006.01) |

(Continued)

(52) U.S. Cl.

CPC ....... *B01D 25/001* (2013.01); *B01D 29/0095* (2013.01); *B01D 29/111* (2013.01); *B01D 46/0001* (2013.01); *B01D 46/527* (2013.01); *B29C 65/52* (2013.01); *B32B 37/0076* (2013.01); *B32B 37/0084* (2013.01); *B32B 37/1292* (2013.01); *B29C 53/24* (2013.01); *B29L 2031/14* (2013.01)

(58) Field of Classification Search

CPC .............. B01D 25/001; B01D 46/0001; B01D 46/527; B01D 29/0095; B01D 29/111; B32B 37/0076; B32B 37/1292; B32B 37/0084; B29C 65/52; B29C 53/24; B29L 2031/14

See application file for complete search history.

(56) References Cited

U.S. PATENT DOCUMENTS

2014/0196422 A1* 7/2014 Lin ........................ B01D 67/00 55/498

FOREIGN PATENT DOCUMENTS

| | | |
|---|---|---|
| CN | 104815488 A | 8/2015 |
| DE | 102015108947 A1 | 10/2016 |

(Continued)

*Primary Examiner* — Taiwo Oladapo

(74) *Attorney, Agent, or Firm* — McCoy Russell LLP

(57) ABSTRACT

A filter core and manufacturing method thereof, the manufacturing method has the following steps: adhering a wavy filtering sheet and a flat filtering sheet, pressing the filtering sheets, and rolling the filtering sheets. A part of peaks of the wavy filtering sheet are pressed to lean toward a same side. In particular, two sides of a first end sealing adhesive layer are pressed. Thus, the first end sealing adhesive layer is concentrated, such that the glue is uniformly spread to the two sides. Besides, the pressing on the two sides makes the two sides of the first end sealing adhesive layer adhered securely, thereby preventing the wavy filtering sheet from rebounding upward and forming bubbles. Thus, the first end sealing adhesive layer can be formed with less quantity of glue, which accelerating the cooling and raises manufacture efficiency.

13 Claims, 12 Drawing Sheets

(51) Int. Cl.

| | |
|---|---|
| ***B01D 46/00*** | (2006.01) |
| ***B01D 46/52*** | (2006.01) |
| *B29C 53/24* | (2006.01) |
| *B29L 31/14* | (2006.01) |

(56) References Cited

FOREIGN PATENT DOCUMENTS

| | | | |
|---|---|---|---|
| TW | I499447 | B | 9/2015 |
| TW | 201538330 | A | 10/2015 |

* cited by examiner

FILTER CORE AND MANUFACTURING METHOD THEREOF

CROSS-REFERENCE TO RELATED APPLICATIONS

This application is based upon and claims priority under 35 U.S.C. 119 from Taiwan Patent Application No. 105122384 filed on Jul. 15, 2016, which is hereby specifically incorporated herein by this reference thereto.

BACKGROUND OF THE INVENTION

1. Field of the Invention

The present invention relates to a filter core and a manufacturing method thereof, and in particular to a filter core for filtering suspended particles from fluid.

2. Description of the Prior Arts

A conventional filter cartridge comprises a filter frame and a filter core. The filter core is mounted in the filter frame, and comprises a wavy filtering sheet and a flat filtering sheet. The filtering sheets are rolled into the shape of a cylinder and are alternately stacked to form multiple axial channels, which have the same shape and size. Each of half of the channels is coated with an end sealing adhesive layer at an axial end adjacent to the inlet of the housing to seal said channel. Each one of the other half of the channels is coated with an end sealing adhesive layer at an axial end adjacent to the outlet of the housing to seal said channel. Therefore, the fluid to be filtered enters half of the channels, flows along said half of the channels, hits the end sealing adhesive layer adjacent to the outlet, and thus passes through the wavy filtering sheet and the flat filtering sheet to the other half of the channels, such that the fluid can leave the filter core. The fluid is filtered to make dust in the fluid attached to the wavy and the flat filtering sheets when the fluid passes through the wavy and the flat filtering sheets.

When the filter core is manufactured, first, the two filtering sheets are adhered with each other via one of the end sealing adhesive layers. Then, a pressing roller presses a side of the adhered filtering sheets along an outer side of said end sealing adhesive layer. Afterward, the other end sealing adhesive layer is coated on the pressed filtering sheets, and finally the two filtering sheets are rolled into the filter core. The pressed side of the filtering sheets becomes an outlet side of the filter core, such that a sectional area of an outlet opening is larger than a sectional area of an inlet opening in each channel. Therefore, the impedance and an aerodynamic force needed when an engine is motivated are both reduced, which saves the energy. However, the above-mentioned pressing step has the following shortcomings:

First, the site of the pressing is disposed in an outer side of the end sealing adhesive layer. Thus, the pressing makes the end sealing adhesive layer, which is not solidified yet, easily spread toward an inner side of the end sealing adhesive layer (toward the center of the filtering layers). Consequently, the end sealing adhesive layer spreads to the two sides in different quantities, with one of the two sides of the end sealing adhesive layer having insufficient adhesion. Therefore, after pressing, the above filtering sheet may rebound upward, which enlarges the space between the two filtering sheets. Thus, the glue to form the end sealing adhesive layer is not sufficient, and bubbles may be incurred in the end sealing adhesive layer, which makes the end sealing adhesive layer incapable of sealing the channels effectively.

To solve the above-mentioned problem, the manufacturer may use larger quantity of glue to form the end sealing adhesive layer. However, the larger quantity of glue requires more time to be solidified. The glue does not have the adhering effect until solidified. Thus, larger quantity of the glue requires more time to ensure the two filtering sheets are adhered securely.

Second, when pressing the two filtering sheets, the glue that spreads toward the outer side of the end sealing adhesive layer may leak in excess, particularly to the situation when larger quantity of the glue is used. Thus, the end sealing adhesive layer cannot be coated at a position too close to an edge of the filtering sheet. So a part that is not coated of the filtering sheet is reserved, and the reserved part is cut off in the final step. However, the cutting device and the cutting step take time and effort. In addition, if the coating position is too far from the edge of the filtering sheet, the filtering area is reduced, too.

To overcome the shortcomings, the present invention provides a filter core and manufacturing method thereof to mitigate or obviate the aforementioned problems.

SUMMARY OF THE INVENTION

The main objective of the present invention is to provide a filter core and manufacturing method thereof that has a better adhesive effect with less quantity of glue and omits the cutting step.

The manufacturing method of the filter core has the following steps:

(a) adhering a wavy filtering sheet and a flat filtering sheet, wherein the wavy filtering sheet is for filtering suspended pollutants and has multiple peaks, an outlet side, an inlet side opposite the outlet side, a first surface and a second surface opposite the first surface; the first surface is coated with a first end sealing adhesive layer, and the first end sealing adhesive layer is coated along the outlet side and arranged apart from the outlet side; the flat filtering sheet for filtering suspended pollutants is adhered with the first surface of the wavy filtering sheet by the first end sealing adhesive layer;

(b) pressing the wavy filtering sheet and the flat filtering sheet: pressing the second surface of the wavy filtering sheet along the outlet side of the wavy filtering sheet to form a first pressing region and a second pressing region; wherein the first pressing region is disposed between the outlet side of the wavy filtering sheet and the first end sealing adhesive layer, and the first end sealing adhesive layer is disposed between the first pressing region and the second pressing region; the peaks of the wavy filtering sheet in the first pressing region and in the second pressing region are pressed to lean toward a same side;

(c) rolling the wavy filtering sheet and the flat filtering sheet: coating a second end sealing adhesive layer on the second surface of the wavy filtering sheet, then rolling the wavy filtering sheet and the flat filtering sheet and making the wavy filtering sheet and the flat filtering sheet adhered with each other and fixed into a rolled shape by the second end sealing adhesive layer to form a filter core.

The filter core has:

a wavy filtering sheet for filtering suspended pollutants, having multiple peaks formed on the wavy filtering sheet;
- an outlet side;
- an inlet side opposite the outlet side;
- a first surface; and
- a second surface opposite the first surface;

a flat filtering sheet for filtering suspended pollutants, the flat filtering sheet attached to the first surface of the wavy filtering sheet;

a first end sealing adhesive layer coated on the first surface and spread along the outlet side, and arranged apart from the outlet side; and a second end sealing adhesive layer coated on the second surface and spread along the inlet side;

wherein the wavy filtering sheet and the flat filtering sheet are adhered with each other by the first end sealing adhesive layer; the wavy filtering sheet and the flat filtering sheet are rolled to be adhered with each other by the second end sealing adhesive layer;

wherein the wavy filtering sheet further has a first pressing region formed on the second surface, the first pressing region disposed between the outlet side of the wavy filtering sheet and the first end sealing adhesive layer; and a second pressing region formed on the second surface; wherein the first end sealing adhesive layer is disposed between the first pressing region and the second pressing region; the peaks of the wavy filtering sheet in the first pressing region and in the second pressing region lean clockwise or counterclockwise together.

Since two sides of the first end sealing adhesive layer are pressed, the first end sealing adhesive layer is concentrated, such that the glue is uniformly spread to the two sides. In addition, the pressing on the two sides makes the two sides of the first end sealing adhesive layer adhered securely, thereby preventing the wavy filtering sheet from rebounding upward and forming bubbles. Thus, the first end sealing adhesive layer can be formed with less quantity of glue, which accelerating the cooling and raises manufacture efficiency. Furthermore, the less quantity of glue also prevents excess glue when pressing, such that the first end sealing adhesive layer can be coated at a position near the outlet side. As a result, the filtering area is enlarged, and the cutting step is omitted to raise manufacture efficiency.

Other objectives, advantages and novel features of the invention will become more apparent from the following detailed description when taken in conjunction with the accompanying drawings.

DETAILED DESCRIPTION OF THE PREFERRED EMBODIMENTS

Figure 8:
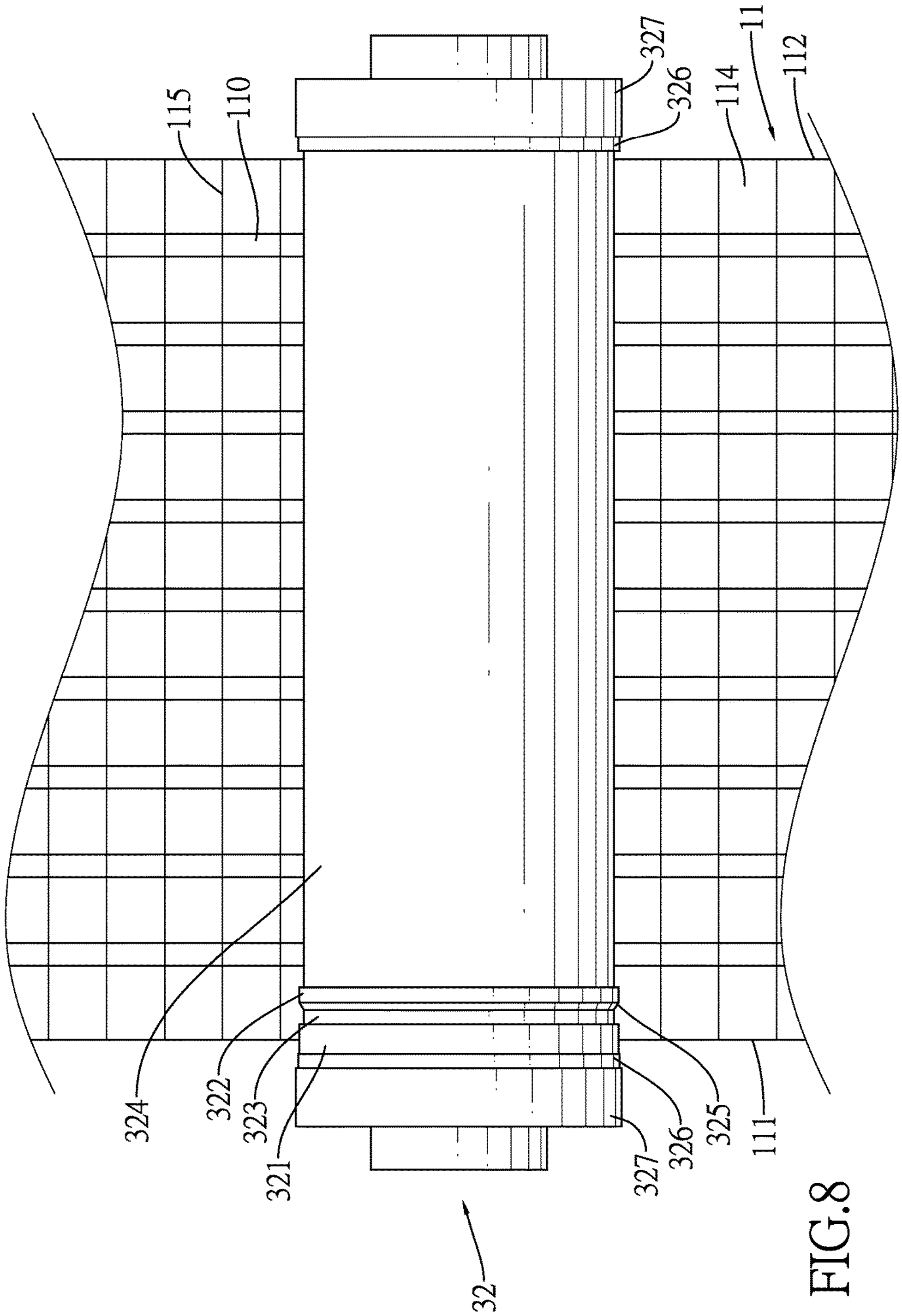
FIG. 8 is an operational view of the main pressing roller of the manufacturing method in FIG. 7.
Figure 12:
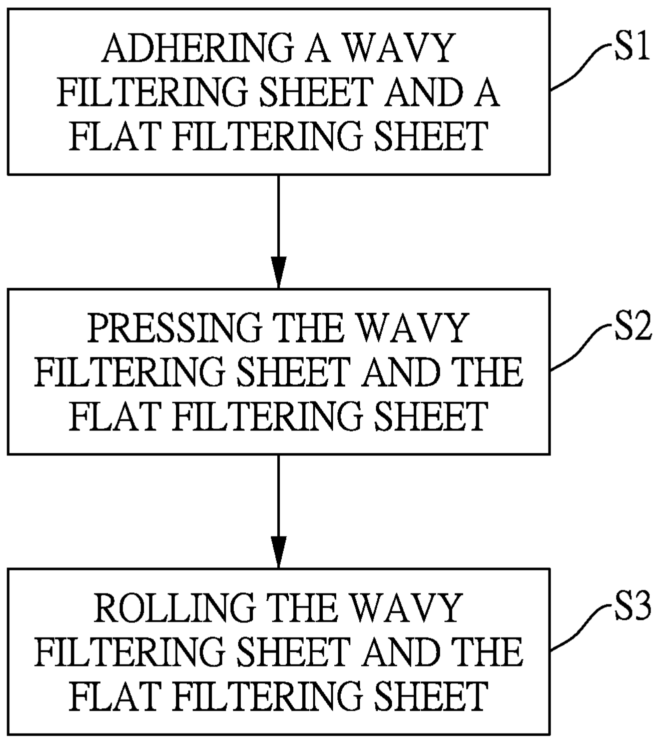
FIG. 12 is a flow chart of a manufacturing method of the filter core in accordance with the present invention.

With reference to FIGS. 2, 3, 6 and 9, a filter core 10 in accordance with the present invention comprises a wavy filtering sheet 11 and a flat filtering sheet 12 both for filtering suspended pollutants. The wavy filtering sheet 11 has multiple peaks 115, an outlet side 111, an inlet side 112, a first surface 113 and a second surface 114. The outlet side 111 and the inlet side 112 are disposed opposite each other, are parallel with each other, and are perpendicular to the peaks 115 in extending direction. The first surface 113 and the second surface 114 are disposed opposite each other. A first end sealing adhesive layer 13 is coated on the first surface 113, is spread along the outlet side 111, and is arranged apart from the outlet side 111. With reference to FIGS. 8 and 12, a second end sealing adhesive layer 14 is coated on the second surface 114, and is spread along the inlet side 112. In a preferred embodiment, an axial outer surface of the second end sealing adhesive layer 14 and the inlet side 112 are, but not limited to, aligned with each other. In another preferred embodiment, the axial outer surface of the second end sealing adhesive layer 14 may be arranged apart from the inlet side 112.

With reference to FIGS. 2 to 6, the flat filtering sheet 12 is adhered with the first surface 113 of the wavy filtering sheet 11 by the first end sealing adhesive layer 13. The filtering sheets 11, 12 are rolled and alternately stacked to be adhered with each other by the second end sealing adhesive layer 14. In a preferred embodiment, the filtering sheets 11, 12 are rolled into be, but not limited to, racetrack-shaped. In another preferred embodiment, the filtering sheets 11, 12 may be rolled into be circular or in any other shape.

Figure 3:
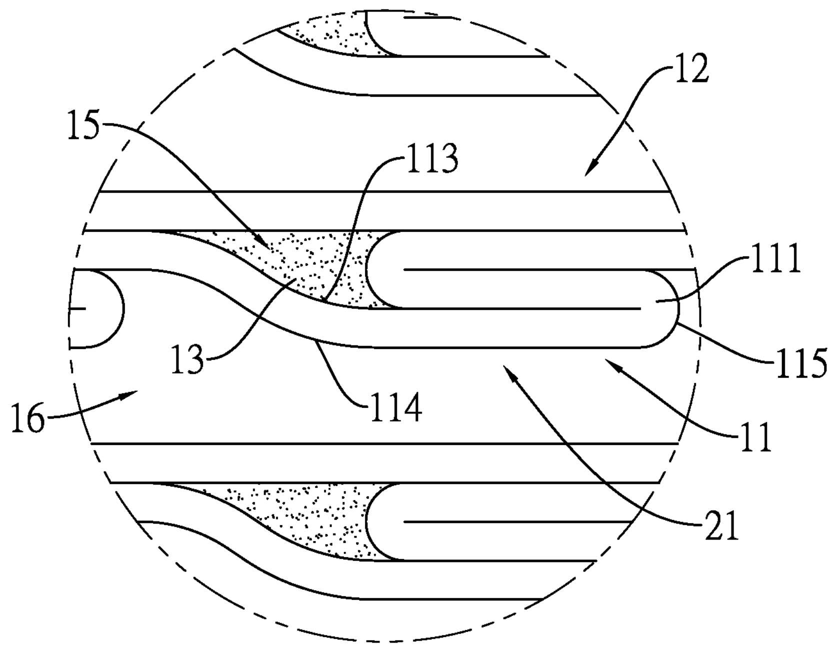
FIG. 3 is an enlarged view of the encircled area 3 in FIG. 2.
Figure 4:
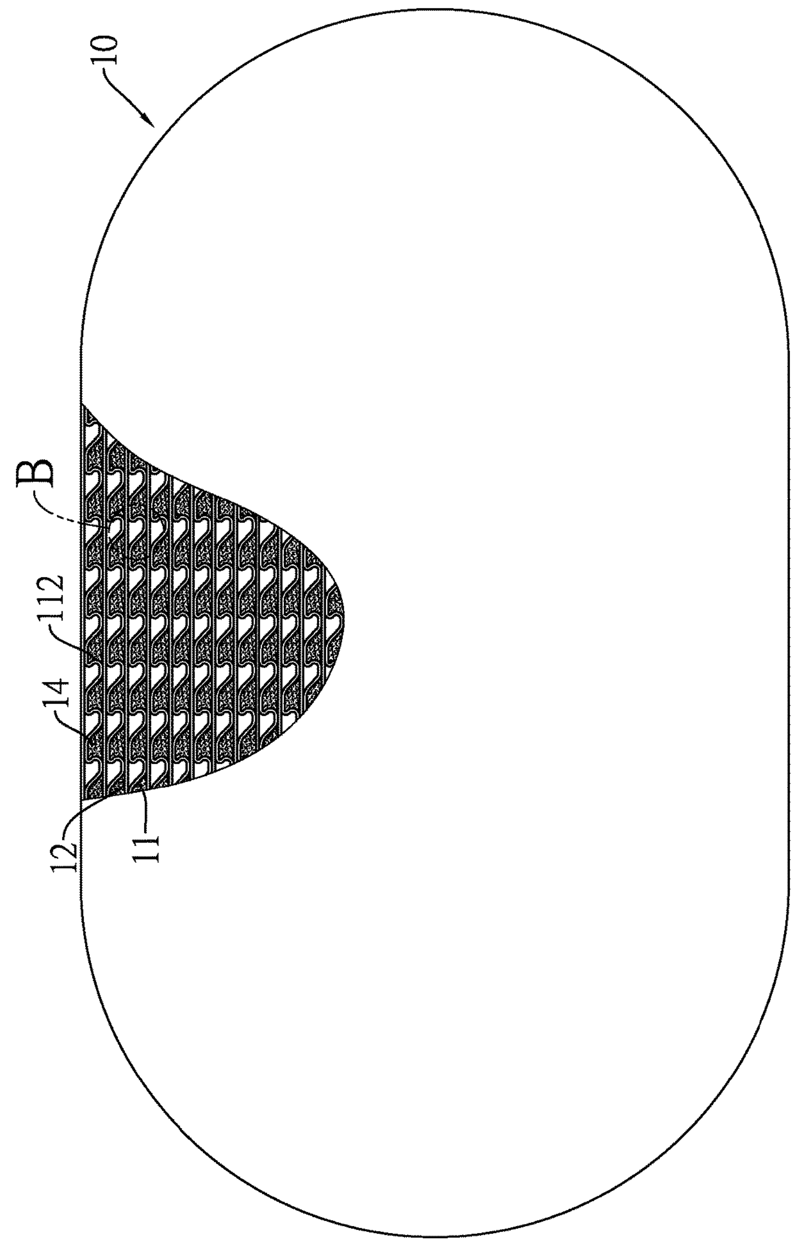
FIG. 4 is an end view of an inlet side of the filter core in FIG. 1.
Figure 5:
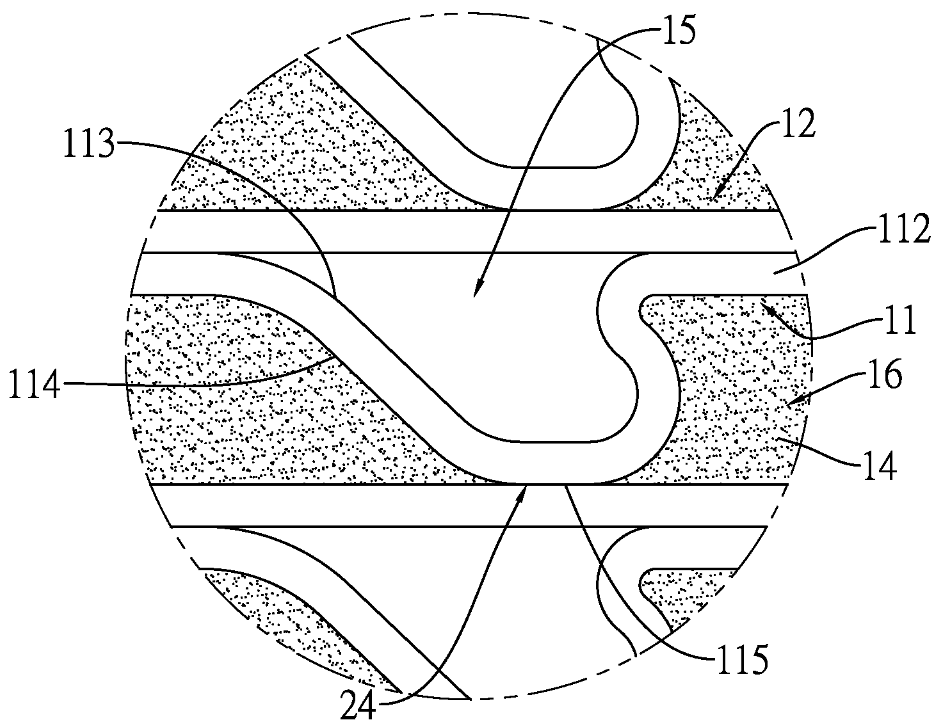
FIG. 5 is an enlarged view of the encircled area 5 in FIG. 4.
Figure 6:
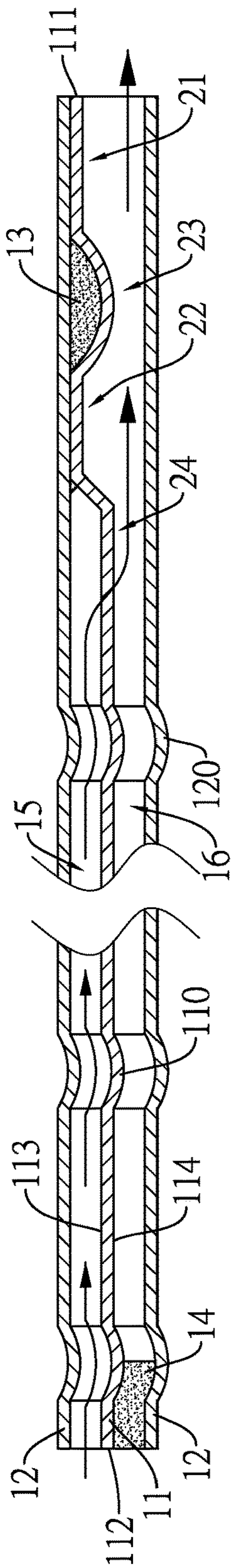
FIG. 6 is a side view in partial section of the filter core in FIG. 1.

With reference to FIGS. 3, 5 and 6, multiple first channels 15 and multiple second channels 16 are formed between the rolled filtering sheets 11, 12, and extend axially. The first end sealing adhesive layer 13 is disposed in the first channels 15, and the second end sealing adhesive layer 14 is disposed in the second channels 16. The first channels 15 are disposed radially outward relative to the second channels 16.

Figure 10:
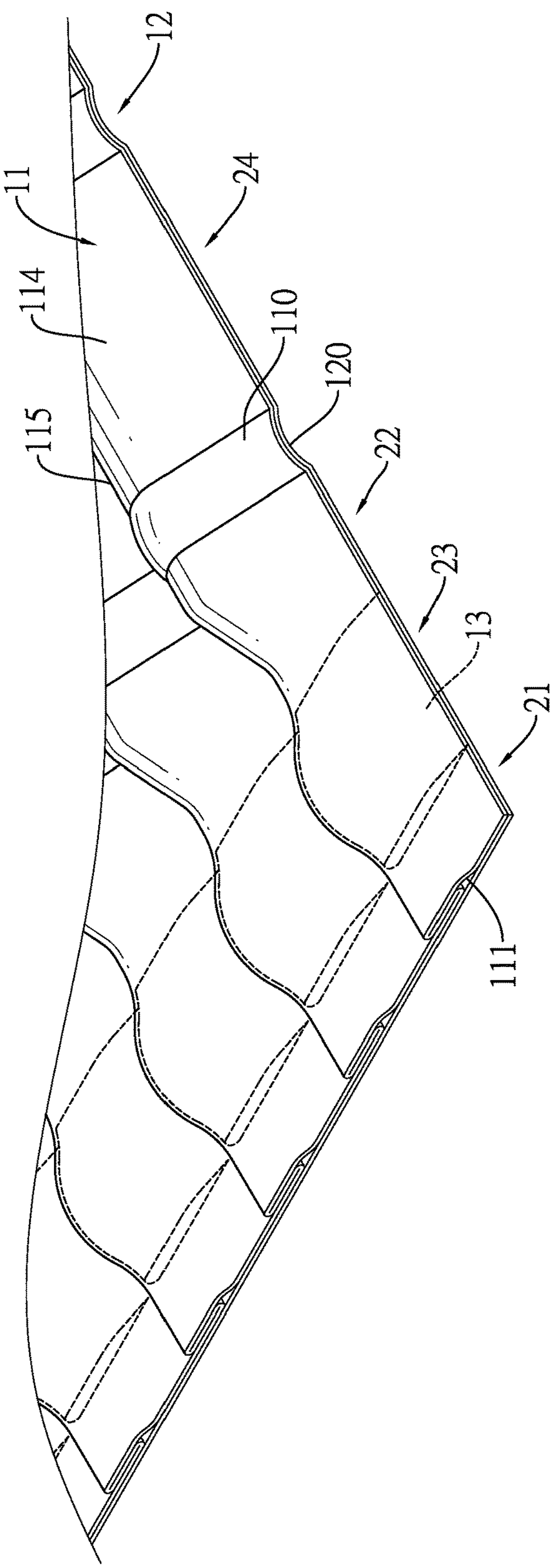
FIG. 10 is an enlarged perspective view in FIG. 9.
Figure 11:
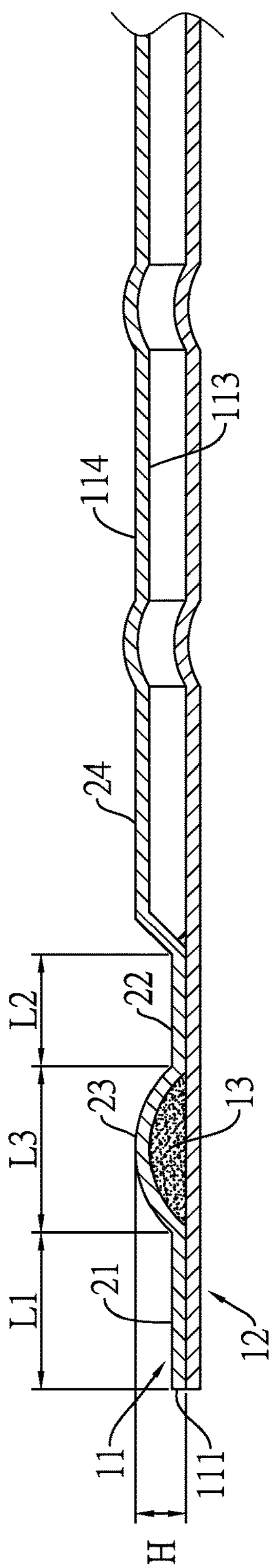
FIG. 11 is a side view in partial section of the filter core in FIG. 1, shown before rolled.

With reference to FIGS. 6, 10 and 11, the wavy filtering sheet 11 further has a first pressing region 21, a second pressing region 22, a third pressing region 23, and a fourth pressing region 24 formed on the second surface 114. The four pressing regions 21, 22, 23, 24 extend along the outlet side 111. The four pressing regions 21, 22, 23, 24 are in sequence the first pressing region 21, the third pressing region 23, the second pressing region 22, and the fourth pressing region 24 from the outlet side 111 to the inlet side 112. The first pressing region 21 extends from the outlet side 111 to an edge of the first end sealing adhesive layer 13. The third pressing region 23 is disposed on the first end sealing adhesive layer 13. The second pressing region 22 extends from the other edge of the first end sealing adhesive layer 13 and toward the inlet side 112. The fourth pressing region 24 extends from an edge of the second pressing region 22 to the inlet side 112. But the positions are by no means limited by the abovementioned, as long as the first pressing region 21 is disposed between the outlet side 111 and the first end sealing adhesive layer 13, and the first end sealing adhesive layer 13 is disposed between the first pressing region 21 and the second pressing region 22. For example, the first pressing region 21 may not extend to the outlet side 111.

The peaks 115 in the first pressing region 21, in the second pressing region 22, in the third pressing region 23, and in the fourth pressing region 24 lean clockwise or counterclockwise together. The first pressing region 21 is equal to the second pressing region 22 in height. In particular, the heights of the first and the second pressing regions 21, 22 may be equal to or smaller than the sum of the heights of the two filtering sheets 11, 12. However, the height relation is by no means limited by the abovementioned, and the heights of the first and the second pressing regions 21, 22 may be different. The third pressing region 23 is equal to the fourth pressing region 24 in height, and the heights of the third and the fourth pressing regions 23, 24 are higher than the heights of the first and the second pressing regions 21, 22. However, the height relation is by no means limited by the abovementioned, and the heights of the third and the fourth pressing regions 23, 24 may be different, as long as the heights of the third and the fourth pressing regions 23, 24 are higher than the heights of the first and the second pressing regions 21, 22. Since the first and the second pressing regions 21, 22 are relatively lower in height, the first and the second pressing regions 21, 22 are not attached to the flat filtering sheet 12 of the other side.

In a preferred embodiment, the wavy filtering sheet 11 has multiple corrugations 110 formed on the wavy filtering sheet 11, axially arranged apart from each other, and being perpendicular to the peaks 115 in extending direction. The flat filtering sheet 12 has multiple corrugations 120 formed on the flat filtering sheet 12 and axially arranged apart from each other. The corrugations 110, 120 of the wavy and the flat filtering sheets 11, 12 correspond to each other in amount, shape and position.

With reference to FIG. 12, a manufacturing method of the filter core in accordance with the present invention comprises the following steps.

Figure 7:
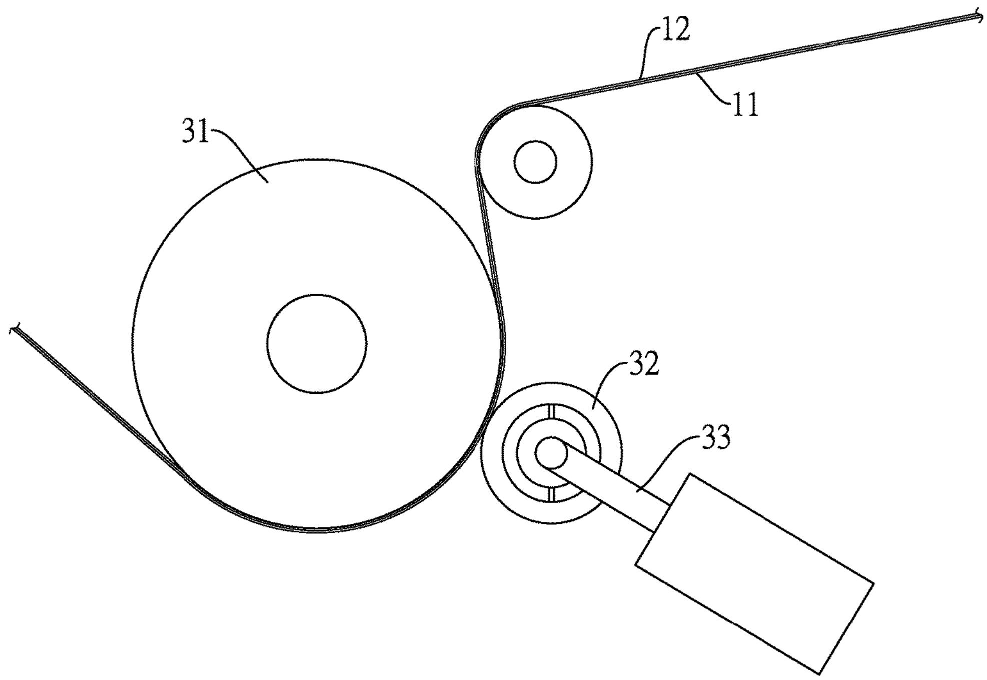
FIG. 7 is a side view of a main pressing roller of a manufacturing method of the filter core in accordance with the present invention.
Figure 9:
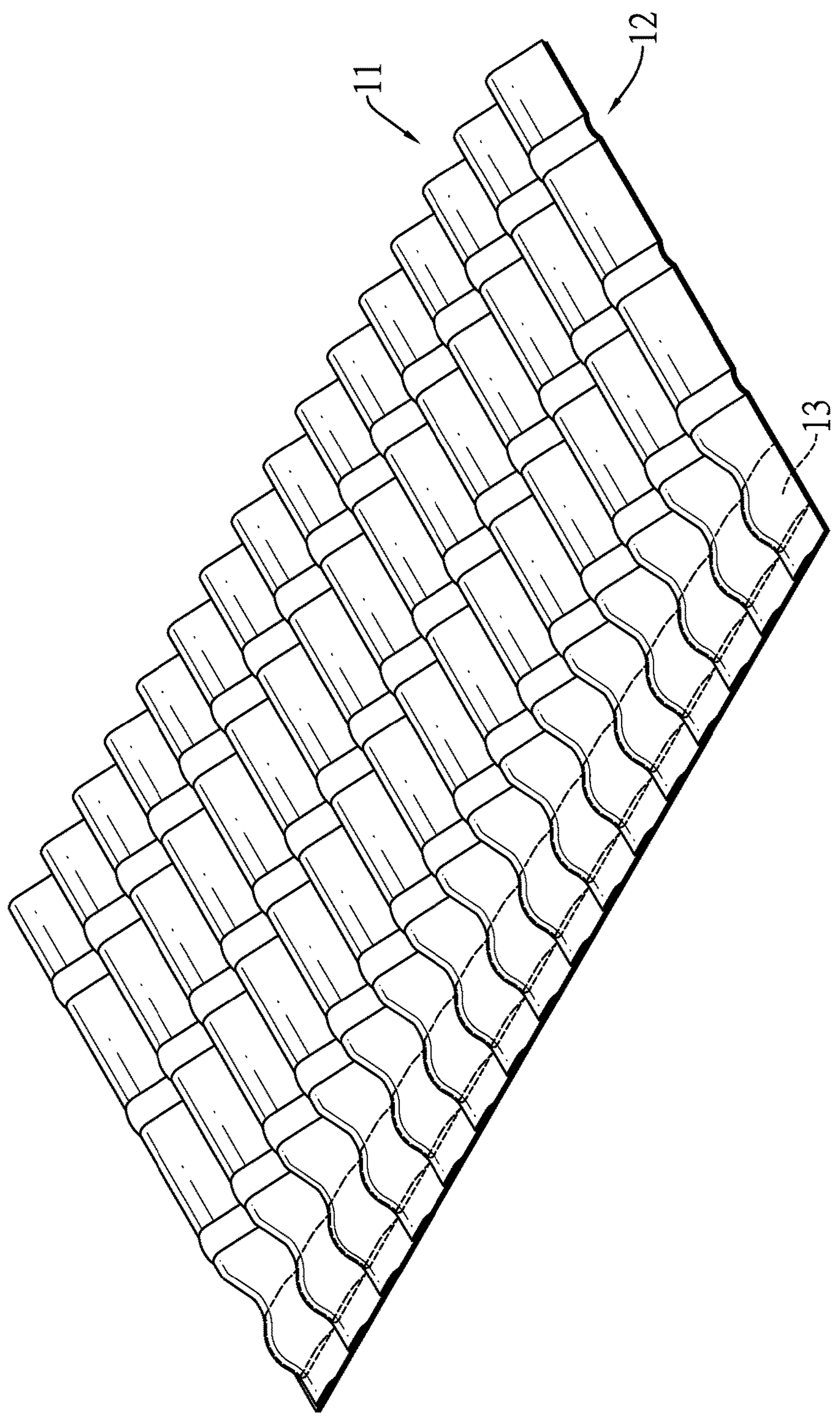
FIG. 9 is a perspective view of the filter core in FIG. 1, shown before rolled.

The first step (S1) is to adhere a wavy filtering sheet 11 to a flat filtering sheet 12. With reference to FIGS. 7 to 9, both the wavy and the flat filtering sheets 11, 12 are for filtering suspended pollutants. The wavy filtering sheet 11 is not yet formed into a wavy shape, and has an outlet side 111, an inlet side 112 opposite the outlet side 111, a first surface 113 and a second surface 114 opposite the first surface 113. The outlet side 111 and the inlet side 112 are parallel with each other.

The wavy filtering sheet 11 is pre-heated first, and then passes between a first pressing roller and a second pressing roller to be formed wavy-shaped with multiple peaks 115 that extend axially. An extending direction of the peaks 115 is perpendicular to the outlet side 111 and the inlet side 112.

Then, the wavy filtering sheet 11 passes a gluing device to coat a first end sealing adhesive layer 13 on the first surface 113 along the outlet side 111. The first end sealing adhesive layer 13 is arranged apart from the outlet side 111. Afterwards, the wavy filtering sheet 11 and the flat filtering sheet 12 together pass between the second pressing roller and a third pressing roller 31 to be tightly pressed together. The flat filtering sheet 12 is adhered with the first surface 113 of the wavy filtering sheet 11 by the first end sealing adhesive layer 13. The third pressing roller 31 simultaneously cools the adhered filtering sheets 11, 12, and rapidly cools the first end sealing adhesive layer 13.

In a preferred embodiment, the wavy filtering sheet 11 has multiple corrugations 110 formed on the wavy filtering sheet 11, axially arranged apart from each other, and being perpendicular to the peaks 115 in extending direction. The flat filtering sheet 12 has multiple corrugations 120 formed on the flat filtering sheet 12 and axially arranged apart from each other. The corrugations 110, 120 of the wavy and the flat filtering sheets 11, 12 correspond to each other in amount, shape and position. However, the wavy and the flat filtering sheets 11, 12 also can be made of material without corrugations.

The second step (S2) is to press the filtering sheets 11, 12. The filtering sheets 11, 12 pass between the third pressing roller 31 and a main pressing roller 32. The main pressing roller 32 is pushed out by a pushing rod 33, such that the main pressing roller 32 and then the third pressing roller 31 clamp the two filtering sheets 11, 12.

With reference to FIG. 8, the main pressing roller 32 has two resilient segments 327, two positioning segments 326, a first pressing segment 321, a second pressing segment 322, a third pressing segment 323, a fourth pressing segment 324, and an oblique pressing segment 325. The two resilient segments 327 are disposed in two ends of the main pressing roller 32, and are made of compressible material. The positioning segments 326 are disposed in inner sides of the resilient segments 327. The five pressing segments are in sequence the first pressing segment 321, the third pressing segment 323, the oblique pressing segment 325, the second pressing segment 322, and the fourth pressing segment 324. The resilient segments 327 are larger than the positioning segments 326 in outer diameter. The positioning segments 326 are larger than the first pressing segment 321 and the second pressing segment 322 in outer diameter. The first pressing segment 321 and the second pressing segment 322 are larger than the third pressing segment 323 and the fourth pressing segment 324 in outer diameter. The oblique pressing segment 325 is larger than the third pressing segment 323 in outer diameter, and is smaller than the second pressing segment 322 in outer diameter. The outer diameter of the oblique pressing segment 325 gradually increases from the third pressing segment 323 to the second pressing segment 322. The first pressing segment 321 is equal to the second pressing segment 322 in outer diameter, and the third pressing segment 323 is equal to the fourth pressing segment 324 in outer diameter. However, the outer diameters are by no means limited by the abovementioned. The first pressing segment 321 and the second pressing segment 322 may be different in outer diameter, and the third pressing segment 323 and the fourth pressing segment 324 may be different in outer diameter.

The pushing rod 33 pushes the main pressing roller 32 toward the third pressing roller 31 until the two resilient segments 327 are pressed to be deformed and the third pressing roller 31 abuts the two positioning segments 326. Therefore, the positioning segments 326 provide the positioning function. At this time, the first to the fourth pressing segments 321, 322, 323, 324 press the peaks 115 of the second surface 114 of the wavy filtering sheet 11 to respectively form a first pressing region 21, a second pressing region 22, a third pressing region 23, and a fourth pressing region 24. The oblique pressing segment 325 corresponds to a boundary between the third pressing region 23 and the second pressing region 22, and forms an annular slope to slightly disperse the pressure.

With reference to FIGS. 6 and 11, the first pressing region 21 extends from the outlet side 111 to an edge of the first end sealing adhesive layer 13. The third pressing region 23 is disposed on the first end sealing adhesive layer 13. The second pressing region 22 extends from the other edge of the first end sealing adhesive layer 13 and toward the inlet side 112. The fourth pressing region 24 extends from an edge of the second pressing region 22 to the inlet side 112. But the positions are by no means limited by the abovementioned. The peaks 115 in the first pressing region 21, the second pressing region 22, the third pressing region 23, and the fourth pressing region 24 are pressed to lean toward a same side. The first pressing region 21 is equal to the second pressing region 22 in height. The third pressing region 23 is equal to the fourth pressing region 24 in height. But the height relation is by no means limited by the abovementioned. The heights of the third and the fourth pressing regions 23, 24 are higher than the heights of the first and the second pressing regions 21, 22. The heights of the third and the fourth pressing regions 23, 24 are higher than the heights of the first and the second pressing regions 21, 22.

In addition, the main pressing roller 32 is made of a heat conductive material, in particular, aluminum. At room temperature, the main pressing roller 32 can rapidly cool the wavy filtering sheet 11 via the property of high heat conduction, thereby solidifying the first end sealing adhesive layer 13. The two filtering sheets 11, 12 are rolled into a cylindrical shape after pressed.

Figure 1:
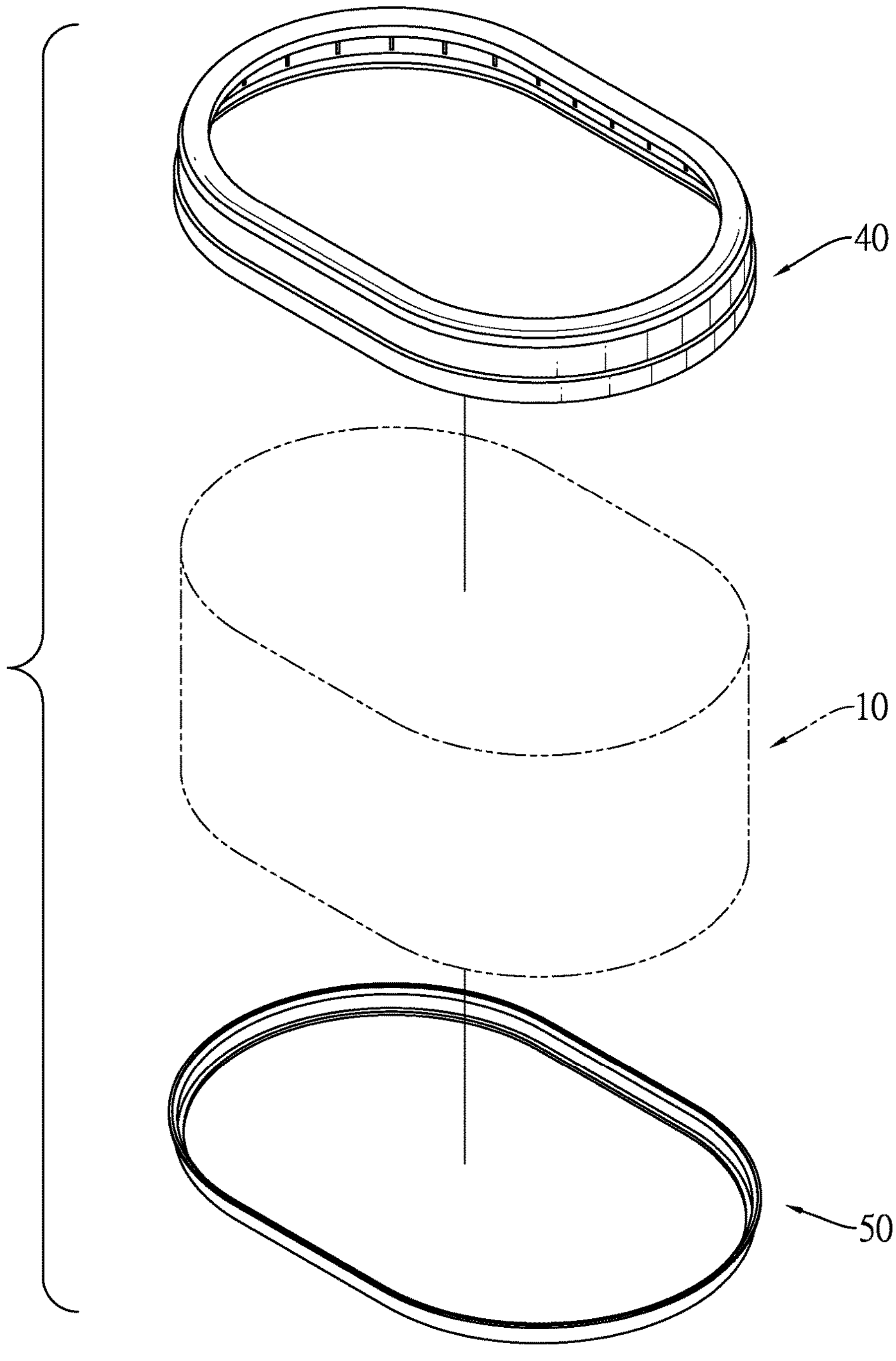
FIG. 1 is a perspective view of a filter core in accordance with the present invention, showing the filter core and two filter frames assembled to become a filter cartridge.
Figure 2:
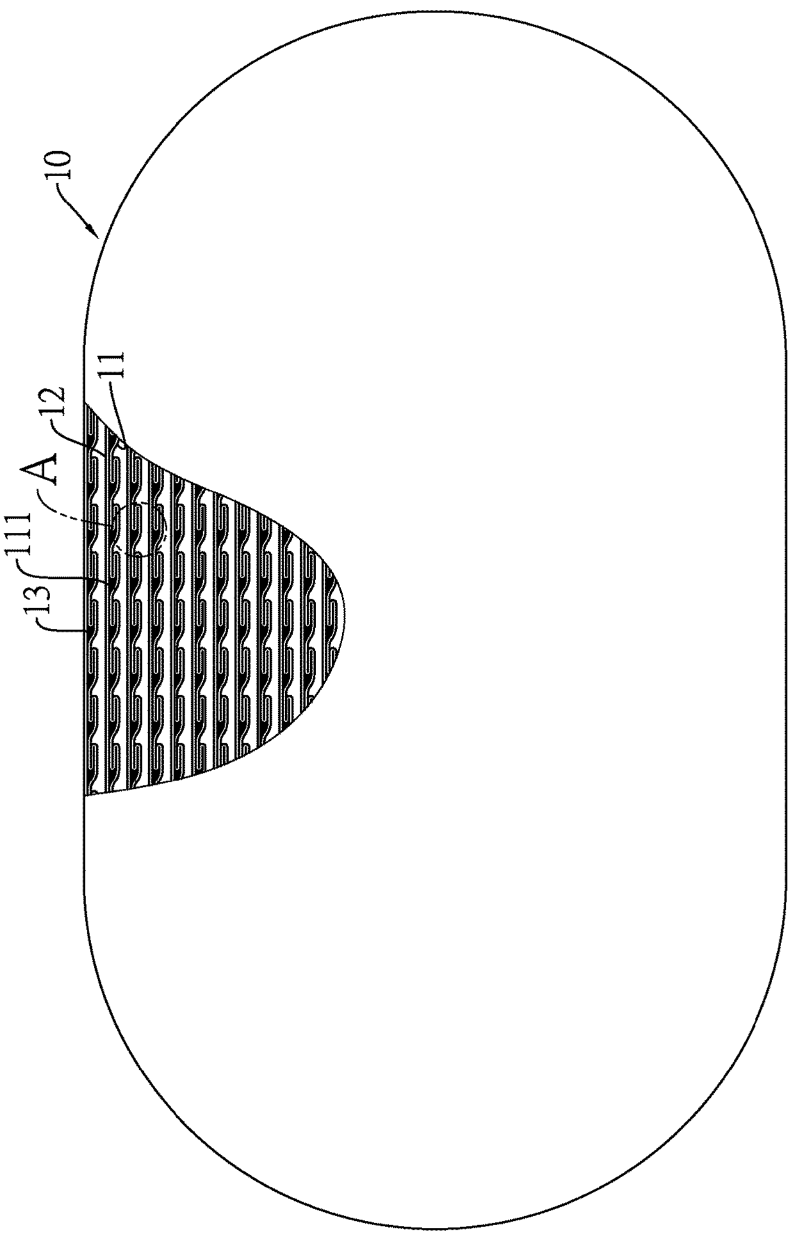
FIG. 2 is an end view of an outlet side of the filter core in FIG. 1.

The third step (S3) is to roll the filtering sheets 11, 12. The rolled filtering sheets 11, 12 are moved to a rolling device, and then are pulled out and expanded. At this time, the filtering sheets 11, 12 can be rolled around a jig, around a tube, or rolled independently without the jig or tube, depending on the desired shape after rolling, such as a racetrack or a circle. Ends of the filtering sheets 11, 12 are fixed on the jig or the tube, if the jig or the tube is adopted. Before the filtering sheets 11, 12 are rolled, a glue gun coats a second end sealing adhesive layer 14 on the second surface 114 of the wavy filtering sheet 11 along the inlet side 112. Then the filtering sheets 11, 12 are rolled with the wavy filtering sheet 11 at the inner side. The filtering sheets 11, 12 are adhered with each other and are fixed into a rolled shape by the second end sealing adhesive layer 14 to form a filter core 10. With reference to FIG. 1, two filter frames 40, 50 are mounted on the filter core 10 to form a filter cartridge. Multiple axial first channels 15 and multiple axial second channels 16 are formed between the rolled filtering sheets 11, 12. The first and the second end sealing adhesive layers 13, 14 are respectively disposed in the first and the second channels 15, 16. The first channels 15 are disposed radially outward relative to the second channels 16.

With reference to FIG. 11, in a preferred embodiment, a width L1 of the first pressing region 21 is between 2 mm and 10 mm, including 2 mm and 10 mm, and particularly is 5 mm. A width L3 of the third pressing region 23 is between 3 mm and 10 mm, including 3 mm and 10 mm, and particularly is 7.5 mm. A width L2 of the second pressing region 22 is between 2 mm and 8 mm, including 2 mm and 8 mm, and particularly is 3 mm. In a preferred embodiment, the width L1 of the first pressing region 21 is slightly larger than the width L2 of the second pressing region 22, and a width of the fourth pressing region 24 is much larger than the width L1 of the first pressing region 21. But the sizes are by no means limited to the abovementioned, and may be adjusted according to the practical situation.

In a preferred embodiment, an original height of the peaks 115 of the wavy filtering sheet 11 is 4 mm. The peaks 115 in the first pressing region 21 and in the second pressing region 22 are pressed to overlap themselves to abut the second surface 114 of the wavy filtering sheet 11 as shown in FIG. 3. In particular, the first pressing region 21 and the second pressing region 22 are pressed to be deformed to make the height of the first and the second pressing regions 21, 22 equal to or smaller than the sum of the heights of the two filtering sheets 11, 12. The height H of the peaks 115 in the third and the fourth pressing regions 23, 24 is 3 mm. With reference to FIGS. 7 and 8, an angle θ between the leaning peaks 115 in the fourth pressing region 24 and the flat filtering sheet 12 is between 0 degree and 60 degrees, including 60 degrees, and particularly is 45 degrees. But the sizes and angles are by no means limited to the abovementioned, and may be adjusted according to the practical situation.

Since two sides of the first end sealing adhesive layer 13 are pressed, the first end sealing adhesive layer 13 is concentrated, such that the glue is uniformly spread to the two sides. In addition, the pressing on the two sides makes the two sides of the first end sealing adhesive layer 13 adhered securely, thereby preventing the wavy filtering sheet 11 from rebounding upward and forming bubbles. Thus, the first end sealing adhesive layer 13 can be formed with less quantity of glue, which accelerating the cooling and raises manufacture efficiency. Furthermore, the less quantity of glue also prevents excess glue when pressing, such that the first end sealing adhesive layer 13 can be coated at a position near the outlet side 111. As a result, the filtering area is enlarged, and the cutting step is omitted to raise manufacture efficiency.

Besides, the first and the second pressing regions 21, 22 are lower than the third and the fourth pressing regions 23, 24 in height (particularly when the first and the second pressing regions 21, 22 are pressed flat), and the first pressing region 21 is disposed adjacent to the outlet side 111, such that a sectional area of an inlet opening of each first channel 15 is smaller than a sectional area of an outlet opening of each second channel 16, thereby reducing the impedance and reducing an aerodynamic force needed when an engine is motivated, which saves the energy.

In addition, because the first channels 15 are disposed radially outward relative to the second channels 16, each first channel 15 must be larger than each second channel 16 in axial sectional area, which makes the sectional area of the inlet opening of each first channel 15 further larger than the sectional area of the outlet opening of each second channel 16, thereby further reducing the impedance.

When the filter core is in use, the corrugations 110, 120 of the wavy and the flat filtering sheets 11, 12 form concave and convex portions on inner walls of the channels 15, 16, and are axially arranged apart from each other. As a result, when the fluid axially flows in the channels 15, 16, the fluid flows curvedly along the concave and convex portions, and the suspended pollutants on the fluid may hit, gather and accumulate on the corrugations 110, 120, thereby slowing the fluid flow and providing one more filtering process. In addition, the corrugations 110, 120 also enlarge the filtering area.

In a preferred embodiment, the wavy filtering sheet has four pressing regions, but the amount of the pressing regions is by no means limited by the abovementioned. The wavy filtering sheet may be implemented without the third pressing region and/or the fourth pressing region. The wavy filtering sheet with the first and the second pressing regions can achieve the main purpose of the present invention.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A manufacturing method of a filter core comprising steps as follows:

(a) adhering a wavy filtering sheet and a flat filtering sheet, wherein the wavy filtering sheet is for filtering suspended pollutants and has multiple peaks, an outlet side, an inlet side opposite the outlet side, a first surface and a second surface opposite the first surface; the first surface is coated with a first end sealing adhesive layer, and the first end sealing adhesive layer is coated along the outlet side and arranged apart from the outlet side; the flat filtering sheet for filtering suspended pollutants is adhered with the first surface of the wavy filtering sheet by the first end sealing adhesive layer;

(b) pressing the wavy filtering sheet and the flat filtering sheet: pressing the second surface of the wavy filtering sheet along the outlet side of the wavy filtering sheet to form a first pressing region and a second pressing region; wherein the first pressing region is disposed between the outlet side of the wavy filtering sheet and the first end sealing adhesive layer, and the first end sealing adhesive layer is disposed between the first pressing region and the second pressing region; the peaks of the wavy filtering sheet in the first pressing region and in the second pressing region are pressed to lean toward a same side; and (c) rolling the wavy filtering sheet and the flat filtering sheet: coating a second end sealing adhesive layer on the second surface of the wavy filtering sheet, then rolling the wavy filtering sheet and the flat filtering sheet and making the wavy filtering sheet and the flat filtering sheet adhered with each other and fixed into a rolled shape by the second end sealing adhesive layer to form a filter core.

2. The manufacturing method as claimed in claim 1, wherein in step (b), the wavy filtering sheet is pressed to make the first pressing region equal to the second pressing region in height.

3. The manufacturing method as claimed in claim 1, wherein in step (b), the wavy filtering sheet is pressed until the peaks in the first pressing region and in the second pressing region lean to abut the second surface of the wavy filtering sheet.

4. The manufacturing method as claimed in claim 1, wherein in step (b), the first pressing region extends from an edge of the first end sealing adhesive layer to the outlet side of the wavy filtering sheet.

5. The manufacturing method as claimed in claim 1, wherein in step (b), the second surface of the wavy filtering sheet is pressed to further form a third pressing region; wherein the third pressing region is disposed on the first end sealing adhesive layer, the peaks in the first pressing region, in the second pressing region, and in the third pressing region are pressed to lean toward a same side; the wavy filtering sheet is pressed to make the third pressing region taller than the first pressing region and the second pressing region in height.

6. The manufacturing method as claimed in claim 5, wherein in step (b), the first pressing region, the second pressing region and the third pressing region are pressed and formed by a main pressing roller, wherein the main pressing roller has a first pressing segment, a second pressing segment, a third pressing segment, and an oblique pressing segment; the first pressing segment, the second pressing segment, and the third pressing segment respectively correspond to the first pressing region, the second pressing region, and the third pressing region; the oblique pressing segment is formed between the second pressing segment and the third pressing segment; the oblique pressing segment is larger than the third pressing segment in outer diameter, and is smaller than the second pressing segment in outer diameter; the outer diameter of the oblique pressing segment gradually increases from the third pressing segment to the second pressing segment.

7. The manufacturing method as claimed in claim 1, wherein in step (b), pressing the second surface of the wavy filtering sheet is pressed to further form a fourth pressing region; wherein the fourth pressing region extends from an edge of the second pressing region to the inlet side of the wavy filtering sheet; the peaks in the first pressing region, in the second pressing region, and in the fourth pressing region are pressed to lean toward a same side; the wavy filtering sheet is pressed to make the fourth pressing region taller than the first pressing region and the second pressing region in height.

8. A filter core comprising:

a wavy filtering sheet for filtering suspended pollutants, having multiple peaks formed on the wavy filtering sheet;

an outlet side;

an inlet side opposite the outlet side;

a first surface; and a second surface opposite the first surface;

a flat filtering sheet for filtering suspended pollutants, the flat filtering sheet attached to the first surface of the wavy filtering sheet;

a first end sealing adhesive layer coated on the first surface and spread along the outlet side, and arranged apart from the outlet side; and a second end sealing adhesive layer coated on the second surface and spread along the inlet side;

wherein the wavy filtering sheet and the flat filtering sheet are adhered with each other by the first end sealing adhesive layer; the wavy filtering sheet and the flat filtering sheet are rolled to be adhered with each other by the second end sealing adhesive layer;

wherein the wavy filtering sheet further has a first pressing region formed on the second surface, the first pressing region disposed between the outlet side of the wavy filtering sheet and the first end sealing adhesive layer; and a second pressing region formed on the second surface; wherein the first end sealing adhesive layer is disposed between the first pressing region and the second pressing region; the peaks of the wavy filtering sheet in the first pressing region and in the second pressing region lean clockwise or counterclockwise together.

9. The filter core as claimed in claim 8, wherein the first pressing region is equal to the second pressing region in height.

10. The filter core as claimed in claim 8, wherein the peaks in the first pressing region and in the second pressing region lean to abut the second surface of the wavy filtering sheet.

11. The filter core as claimed in claim 8, wherein the first pressing region extends from an edge of the first end sealing adhesive layer to the outlet side of the wavy filtering sheet.

12. The filter core as claimed in claim 8 further comprising:

a third pressing region formed on the second surface of the wavy filtering sheet, and disposed on the first end sealing adhesive layer; wherein the peaks in the first pressing region, in the second pressing region, and in the third pressing region lean clockwise or counter-clockwise together; the third pressing region is taller than the first pressing region and the second pressing region in height.

13. The filter core as claimed in claim 8 further comprising:

a fourth pressing region formed on the second surface of the wavy filtering sheet, and extending from an edge of the second pressing region to the inlet side of the wavy filtering sheet; wherein the peaks in the first pressing region, in the second pressing region, and in the fourth pressing region lean clockwise or counterclockwise together; the fourth pressing region is taller than the first pressing region and the second pressing region in height.

* * * * *